July 29, 1941.    G. F. BRYANT    2,251,034
MACHINE TOOL
Filed June 26, 1940    11 Sheets-Sheet 1
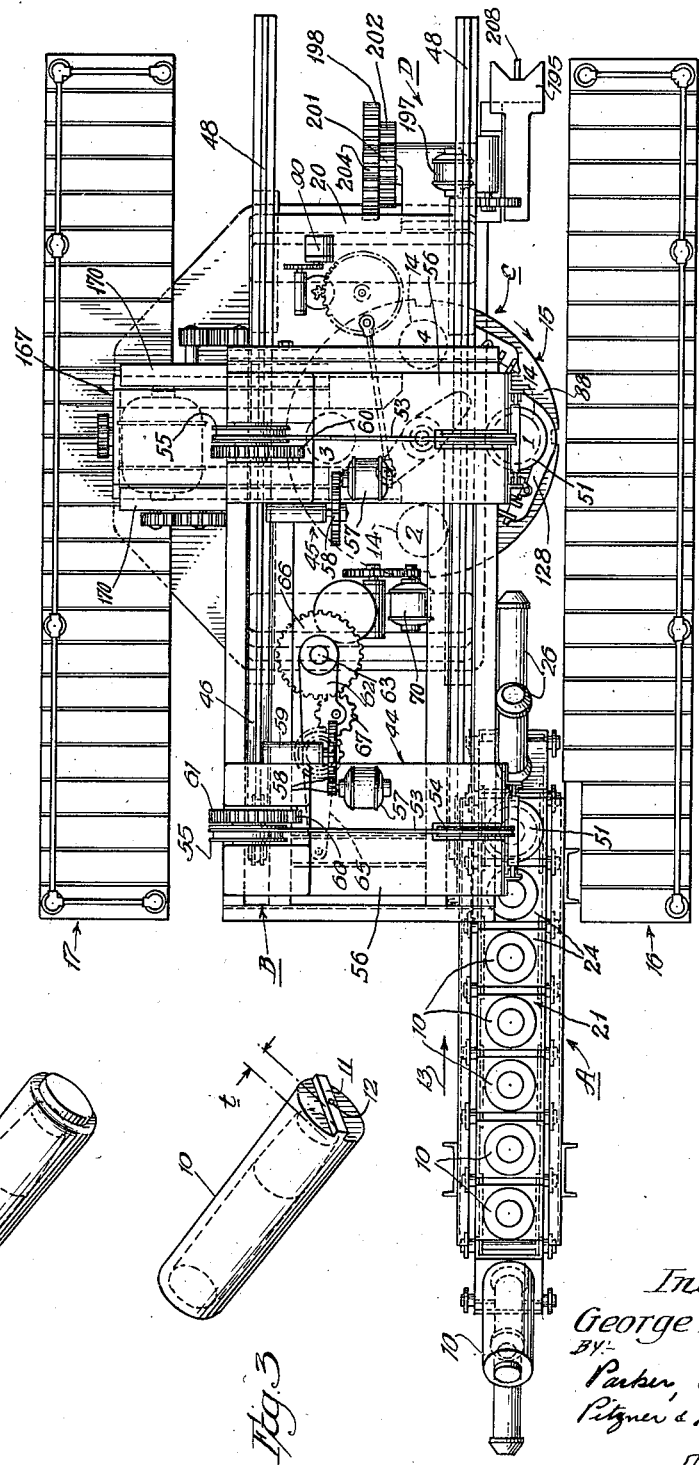
Inventor:
George F. Bryant
By:
Parker, Carlson,
Pitzner & Hubbard
Attorneys

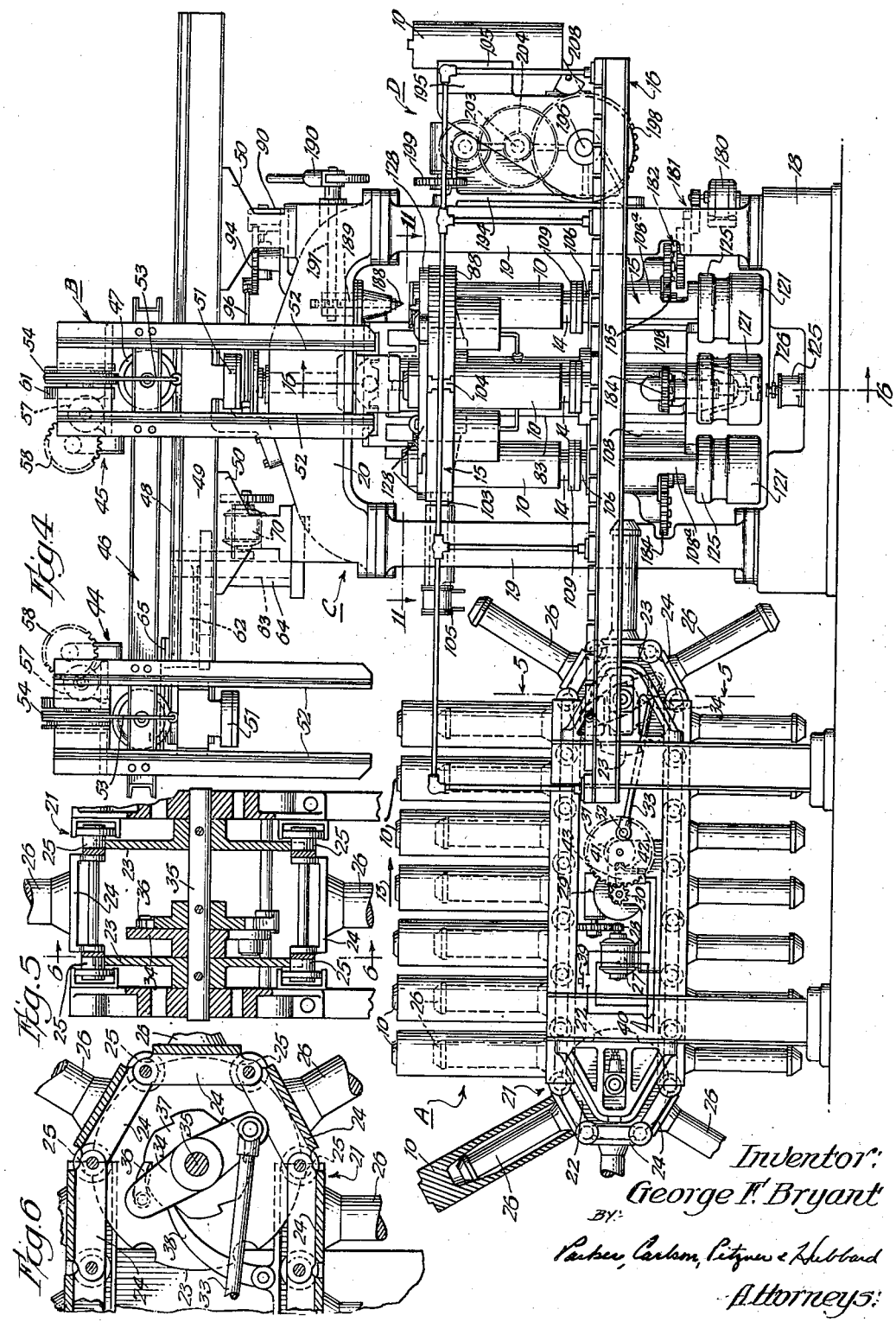

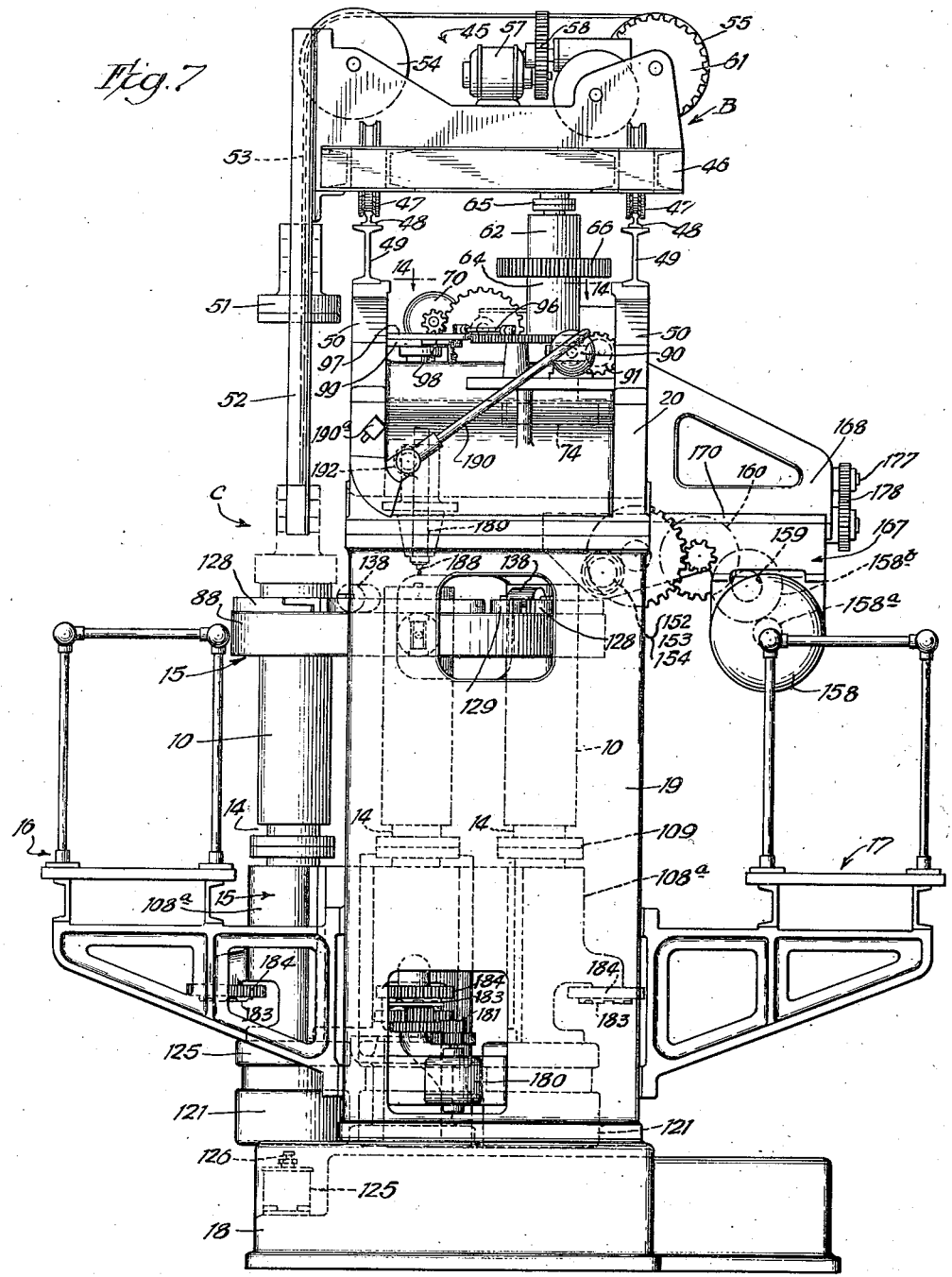

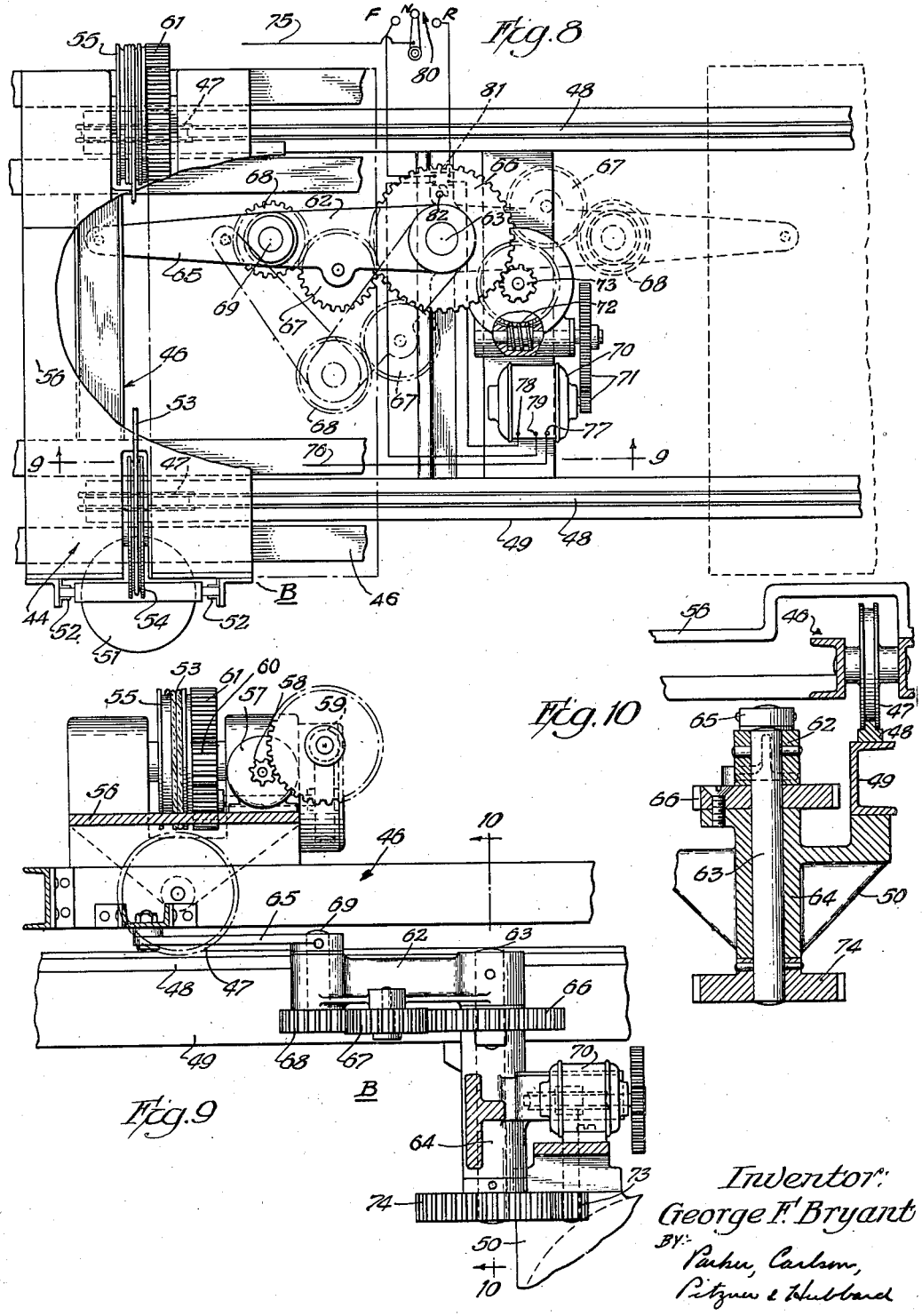

Inventor:
George F. Bryant
By:
Parker, Carlson, Pitzner & Hubbard
Attorneys

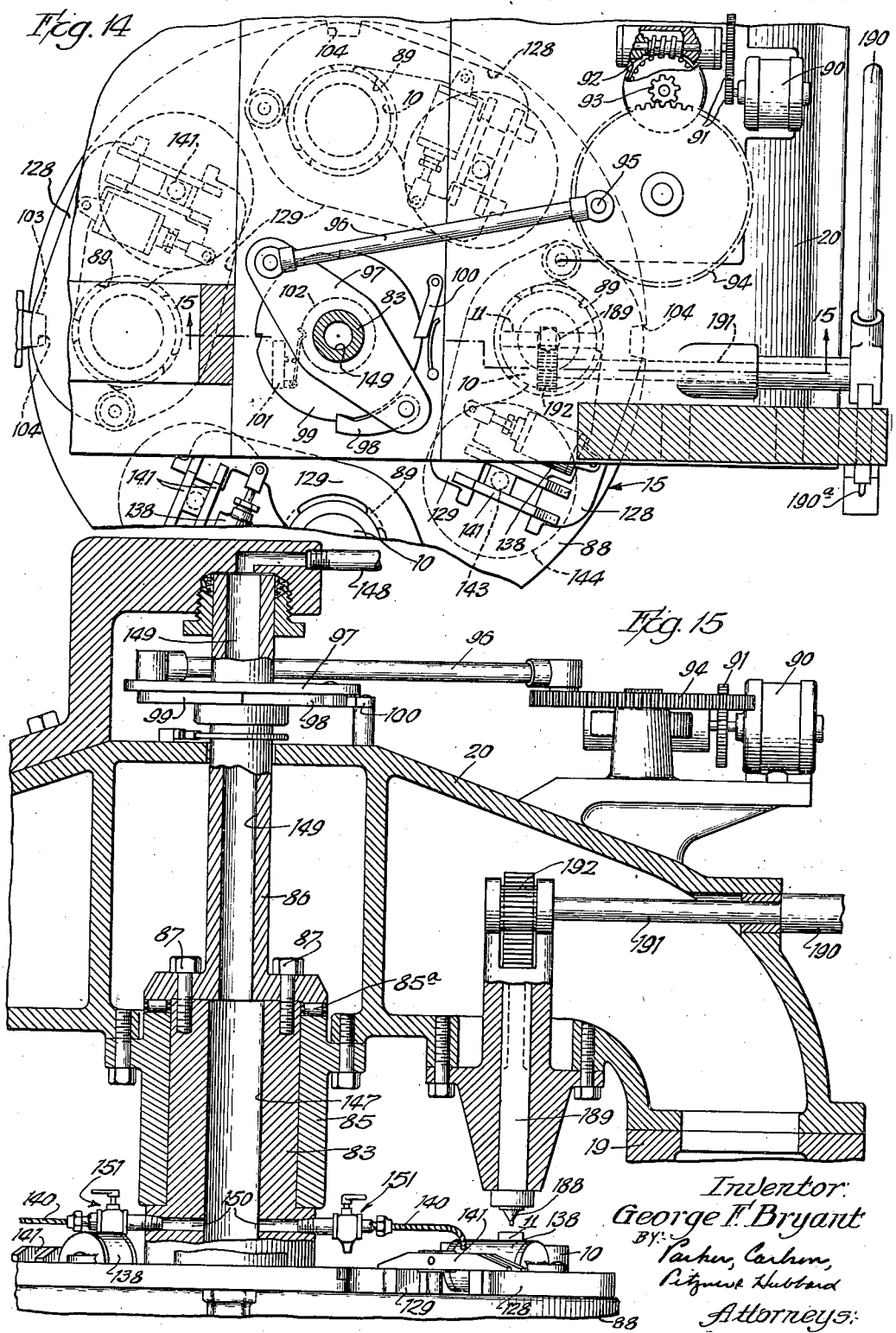

July 29, 1941.　　　G. F. BRYANT　　　2,251,034
MACHINE TOOL
Filed June 26, 1940　　　11 Sheets-Sheet 7

Inventor:
George F. Bryant
BY:
Parker, Carlson, Pitzner & Hubbard
Attorneys

Fig. 18

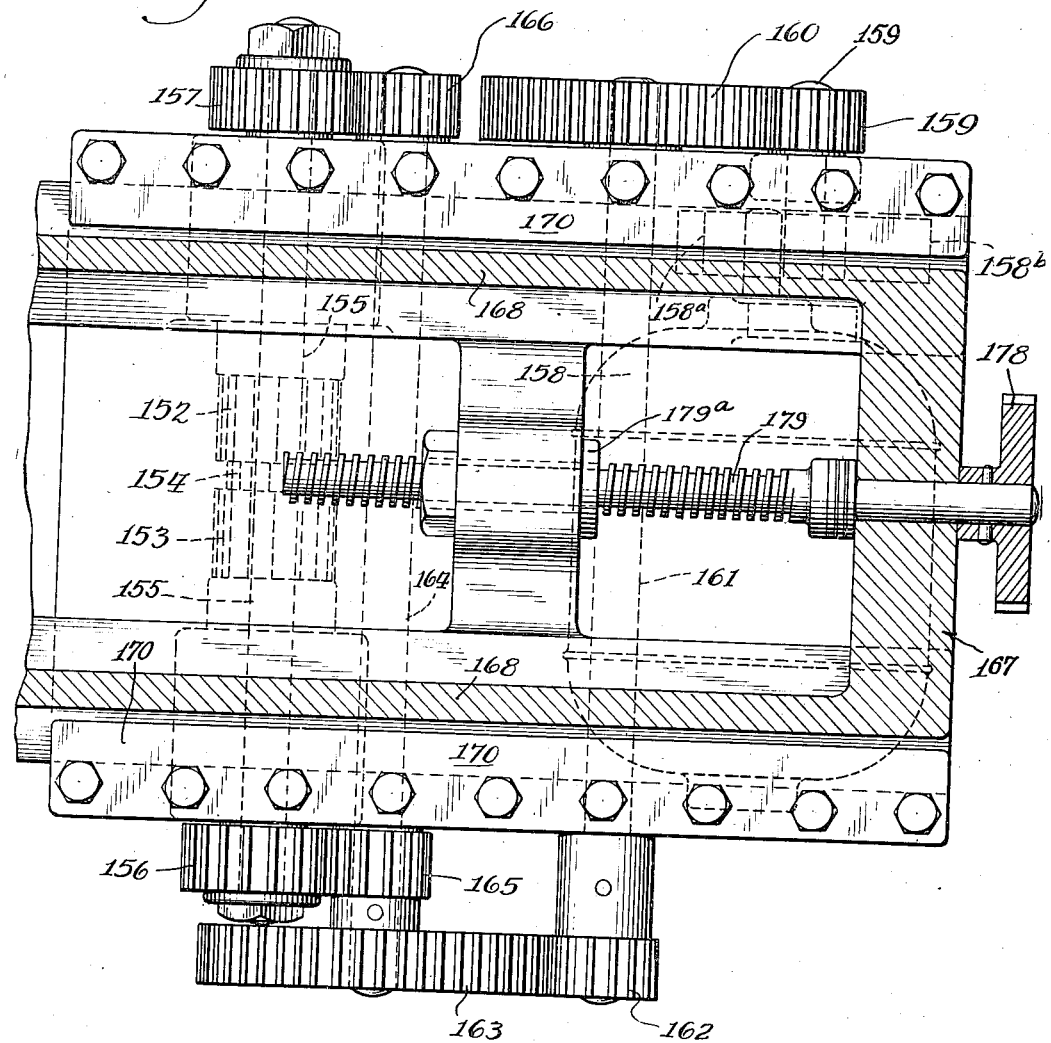

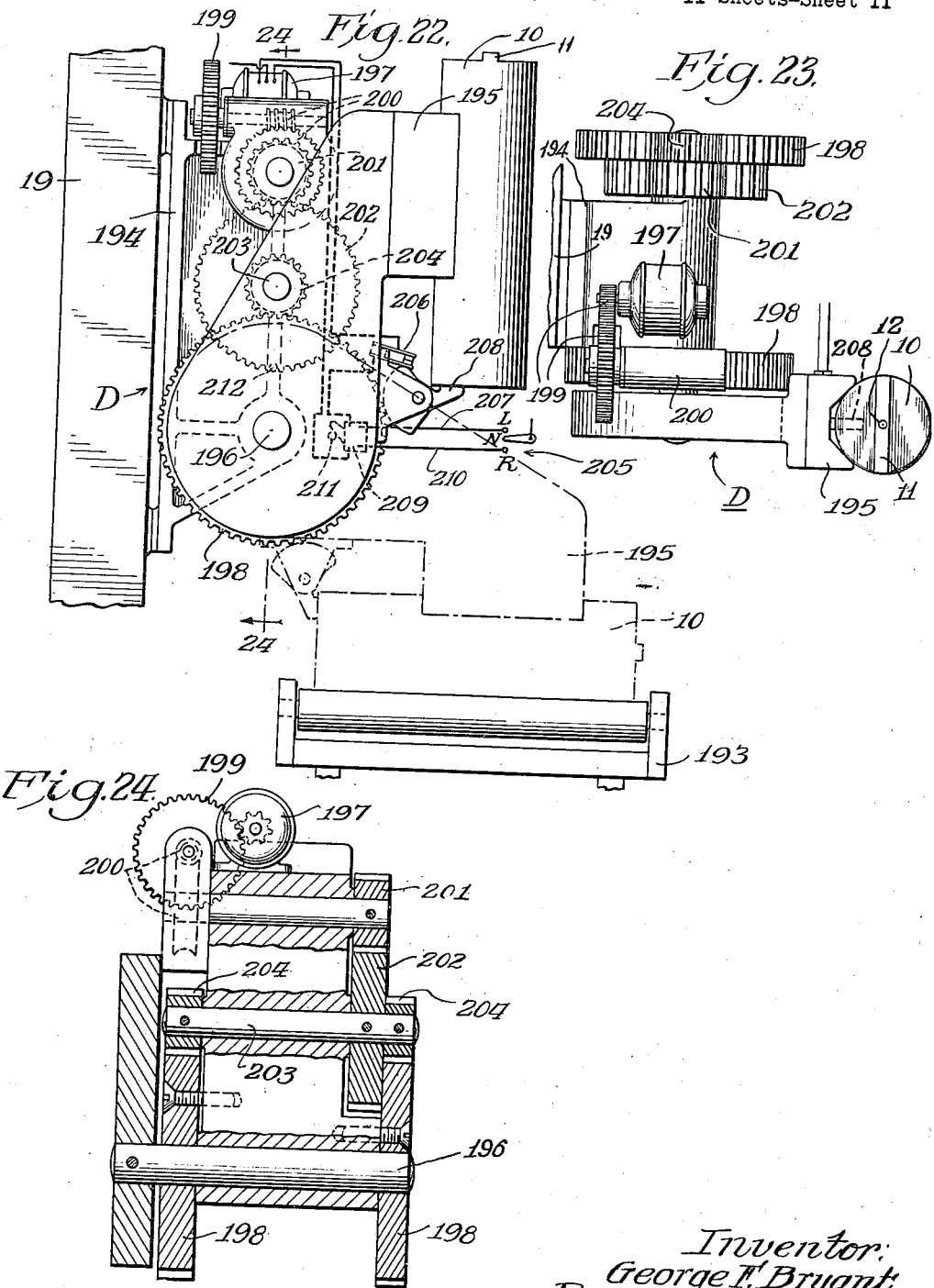

Patented July 29, 1941

2,251,034

UNITED STATES PATENT OFFICE 2,251,034

MACHINE TOOL

George F. Bryant, Chicago, Ill., assignor of one-half to Lucien I. Yeomans, Chicago, Ill.

Application June 26, 1940, Serial No. 342,479

40 Claims. (Cl. 29—38)

The present invention pertains to machine tools and has been illustrated herein as incorporated in a machine tool especially adapted for shaping artillery shell blanks preparatory to turning and boring although those skilled in the art will readily perceive that a number of the features of the invention are of more or less general utility in machine tools.

One object of the invention is to provide a machine especially adapted to machine, at a high production rate, artillery shell blanks or the like in such manner as to form on them an integral rib or other chuck element suitable for use in transmitting the torsion loads on the blanks in subsequent turning or boring operations.

Another object of the invention is to provide a machine adapted to effect expeditiously and economically the end surfacing and drilling of generally cup-shaped metal blanks such as are used for artillery shells.

Another object is to provide a machine tool for performing a metal removing operation on generally tubular metal blanks and which is characterized particularly by the novel arrangement for routing and feeding the blanks through the machine in a more or less continuous stream with speedy and effectual manipulation of the same even when the blanks are quite heavy and bulky as in the case of forged steel blanks for artillery shells.

Another object is to provide in a machine tool of the turret type, a novel arrangement or organization of the parts to facilitate two-man operation, such that one workman stationed on one side of the machine can supervise loading and unloading of the blanks while a second workman on the other side of the turret looks after one or more machining or metal removing operations, the distribution of parts being such as to facilitate efficient operation of a number of elements by each man but without danger of interference between them.

Another object is to provide in a turret type machine tool with a plurality of individually releasable work-holders on the turret, a novel arrangement for actuating the work-holders such that they can be individually released upon arrival at a desired station by suitable power means and yet such that no power supply connections to the revolving turret itself are required.

A more specific object is to provide a machine tool of the character set forth in the last statement of object above and in which a novel arrangement of the work-holders is used, such that they may be individually revolved in carrying out certain machining operations despite the novel releasing mechanism noted.

Another object is to provide a turret type machine tool with a series of individually revoluble work-holders on it and having means for utilizing a single stationarily mounted drive for revolving successive ones of the work-holders at a predetermined station of the turret so that only one driver is required for the whole series of work-holders and even that one need not be mounted on the turret so that the necessity of providing a power supply to it on the moving turret is obviated.

Still another object is to provide a novel machine tool of the turret type such that successive workpieces on the turret can be machined at different stations and by different tools requiring, respectively, rigid clamping of the work and power driven rotation of the same as, for example, in milling a surface on the work and drilling the same by revolving the work with the latter engaged with a non-rotatable drill bit.

A further object is to provide a machine tool having an element, such as a carriage, traversable between limit positions together with a novel drive arrangement therefor such as to insure precision location of the element in its respective limit positions.

The invention also resides in various improvements in the construction and organization of the work-handling mechanism in the machine tool by virtue of which the workpieces are handled swiftly and accurately with quite a simple mechanism.

Further objects and advantages of the invention will become apparent as the following description proceeds, taken in connection with the accompanying drawings in which:

Figure 1 is a plan view of a machine embodying the invention.

Fig. 2 is a detail perspective view of a blank or workpiece of the type adapted to be machined by the apparatus of Fig. 1.

Fig. 3 shows the blank after it is machined.

Fig. 4 is a front elevation of the machine of Fig. 1.

Fig. 5 is an enlarged detail sectional view taken substantially along the line 5—5 in Fig. 4.

Fig. 6 is a sectional view along the line 6—6 in Fig. 5.

Fig. 7 is an end elevation of the machine taken from the right hand end as viewed in Fig. 4 but with the unloader removed.

Fig. 8 is an enlarged partial plan view of the overhead workpiece transfer mechanism for the machine.

Fig. 9 is a vertical section taken substantially along the line 9—9 in Fig. 8.

Fig. 10 is a detail sectional view taken along the line 10—10 in Fig. 9.

Figure 11:
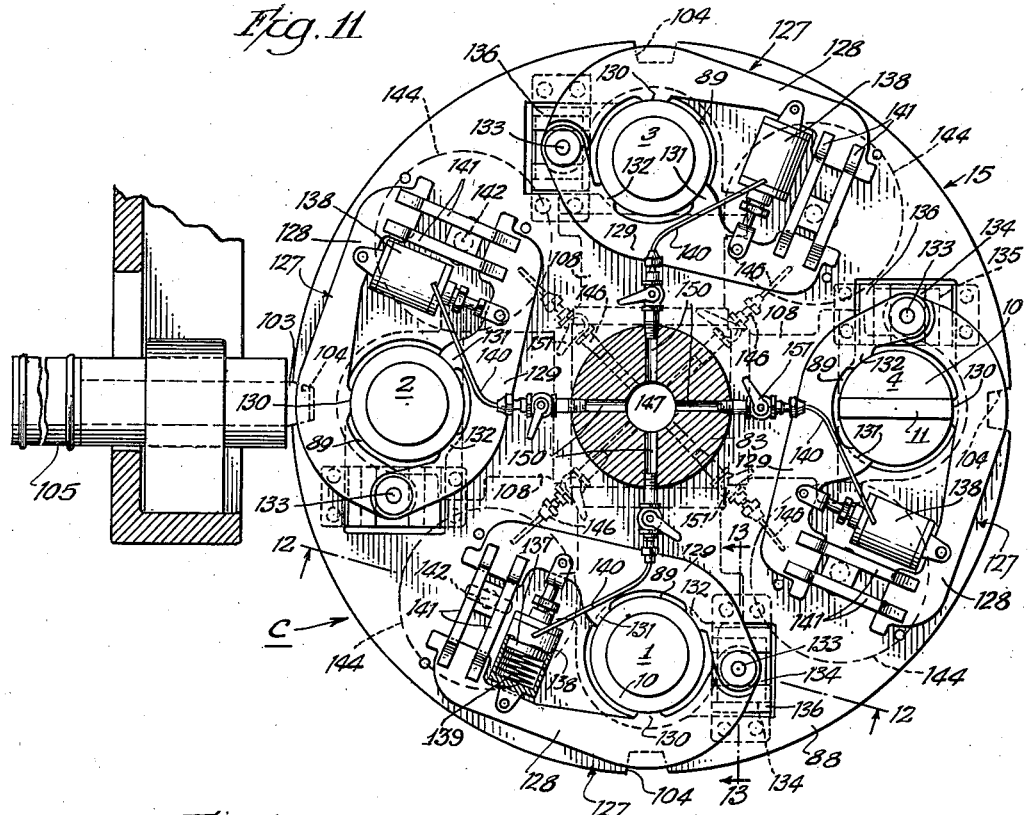
Fig. 11 is a transverse sectional view through the machine taken substantially along the line 11—11 in Fig. 4 and showing the layout of elements on the turret.
Figure 12:
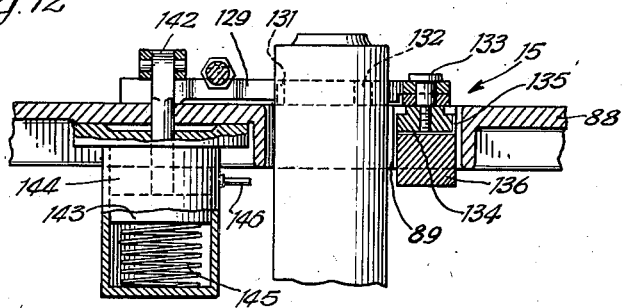
Figure 13:
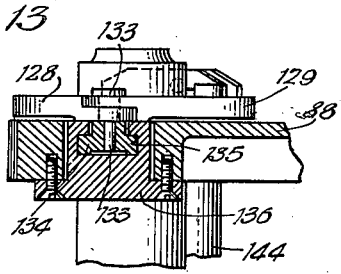

Figs. 12 and 13 are detail sectional views taken respectively along the lines 12—12 and 13—13 in Fig. 11.

Fig. 14 is an enlarged transverse sectional view taken substantially along the line 14—14 in Fig. 7.

Fig. 15 is a vertical sectional view taken substantially along the line 15—15 in Fig. 14.

Fig. 16 is an enlarged fragmentary side elevation, partially in vertical section, of the turret and mandrels carried thereby.

Fig. 17 is a transverse sectional view along the line 17—17 in Fig. 16.

Figure 18:
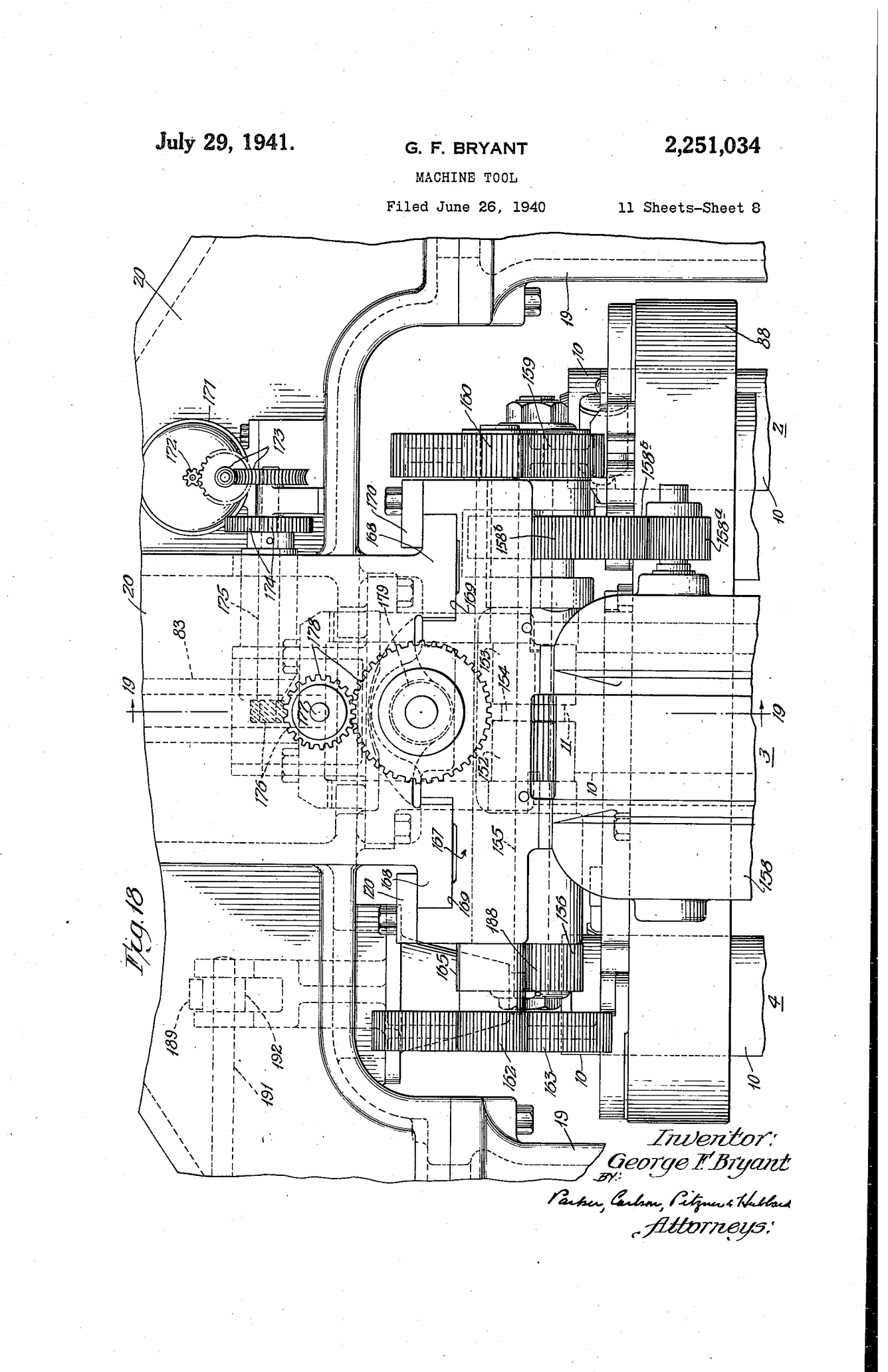

Fig. 18 is an enlarged fragmentary rear elevational view of the machine showing particularly the milling cutter drive mechanism.

Figure 19:
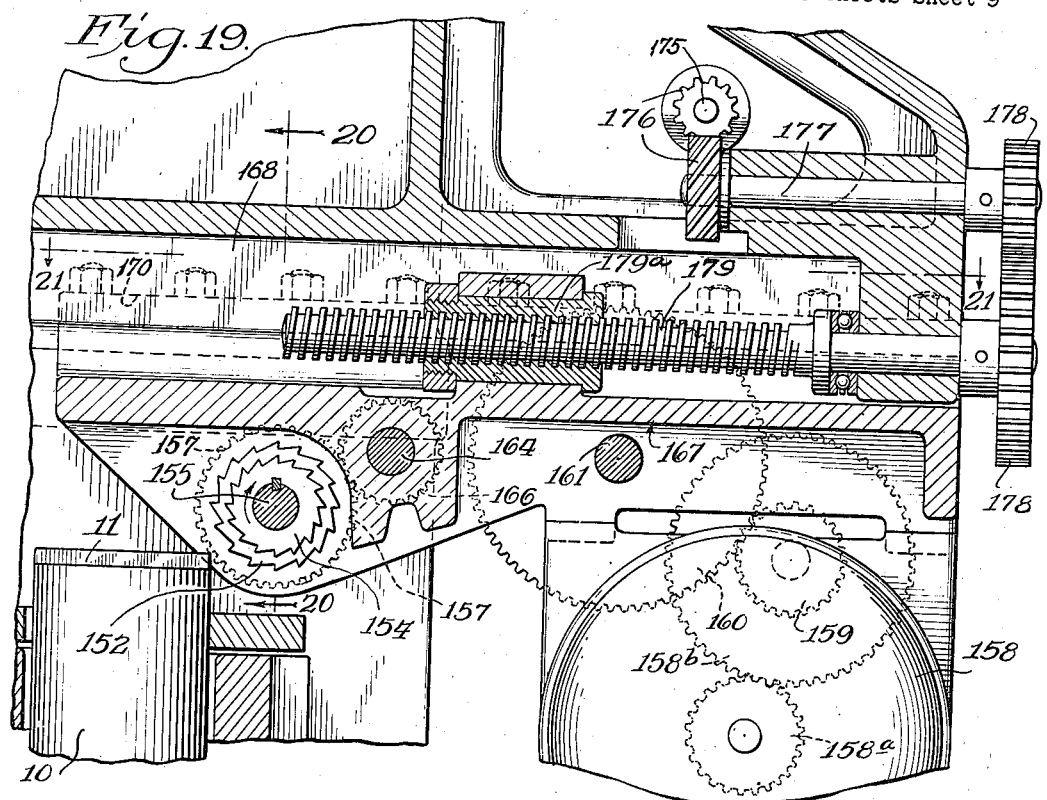

Fig. 19 is a vertical sectional view taken substantially along the line 19—19 in Fig. 18.

Figure 20:
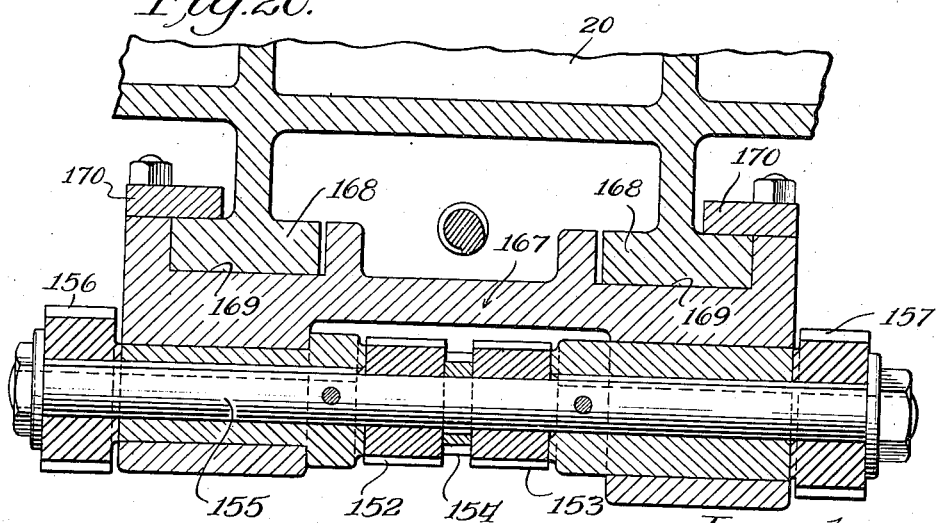

Figs. 20 and 21 are, respectively, vertical and horizontal sections taken along the lines 20—20 and 21—21 in Fig. 19.

Fig. 22 is an enlarged side elevation of the unloader mechanism.

Fig. 23 is a plan view of the unloader mechanism shown in Fig. 22.

Fig. 24 is a vertical sectional view taken substantially along the line 24—24 in Fig. 22.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The machine herein illustrated as an exemplification of my invention is especially adapted for the preparation for turning and boring of cup-shaped forged steel blanks like 10 (Fig. 2) for artillery shells. The blanks 10 are initially forged in a shape like that of Fig. 2. Thereafter it is necessary to rough bore and turn them, taking one or more boring and turning cuts on their interiors and exteriors. Then the open end portions of the blanks are drawn into suitably pointed form and the shells finally finish machined. It has heretofore been the practice to chuck the blanks by exterior or interior frictional grip devices during the rough boring and turning operations noted. Such turning and boring of heavy workpieces, however, subjects the friction gripping elements to tremendous stresses, so that slippage with consequent tool breakage and workpiece damage has been common. In the copending application Serial No. 342,436 filed June 26, 1940 of Lucien I. Yeomans, a method is disclosed and claimed for overcoming this difficulty. In brief the Yeomans method contemplates the fashioning of a chuck element rigid with the workpiece itself such that it can engage with a complemental chuck element in the lathe or boring machine in which the roughing cuts on the blank are made. In this way a positive lock, as distinguished from a mere frictional grip, is provided between the workpiece and its support for transmitting torsion during all boring and turning operations.

The presently disclosed machine is adapted to carry out the method alluded to above and in particular to mill the closed end of the blank 10 of Fig. 2 so as to form on it an integral rib like the rib 11 on the completed blank of Fig. 3. In the course of this milling operation the closed end of the blank 10 is thinned so that it will be of predetermined thickness indicated by the dimension $t$ in Fig. 3. Accurately dimensioning the thickness of metal at this point by external milling is particularly desirable in that the bottom wall of the finished shell, after completion of the turning, boring and pointing, can be completed by simply cutting off the rib 11 when everything else is finished. Additionally, the present machine serves to drill a recess 12 in the end of the blank to receive a lathe center. The location of this lathe center recess 12 is, in the present machine, accurately determined with respect to the longitudinal axis of the cavity within the blank, thereby insuring accuracy of wall thickness in the finished shell. It will be readily appreciated that uniform distribution of weight about its axial center line or, in other words, accuracy of wall thickness is of primary importance in artillery shells since any eccentricity of weight distribution causes them to leave their proper trajectory when fired.

General machine organization

In the instant machine (Figs. 1 and 4) the workpieces 10 are fed to the machine one by one by a conveyer mechanism A, the workpieces traveling in inverted vertical position in the direction of the arrow 13. An overhead transfer mechanism B picks successive blanks 10 off of the conveyer A and carries them over to the machine C where it lowers them onto suitable expansion-jaw type mandrels 14 on a four-station indexing turret 15.

The present machine is designed for operation by two men. One is stationed on a platform 16 on the front of the machine and operates the conveyer A as well as the overhead transfer mechanism B seeing to it that successive blanks are properly located on the turret mandrels. The second operator is stationed on a rear platform 17 and manipulates the controls for tools which shape the blanks. The turret 15 is indexed clockwise (as viewed in Fig. 1) the blanks being loaded on it at station 1. Station 2 is simply an idle station. At station 3 the second operator causes the end of the workpiece to be milled to form the rib 11. At station 4 the second operator manipulates the machine to drill the recesses 12 and when the blanks are finally returned to station 1 they are lifted from their supporting mandrels by the overhead transfer mechanism B and carried over to an unloader D. This unloader mechanism D is also supervised by the operator on the front platform 16 and serves to drop the machined blanks onto a suitable conveyer mechanism or the like.

Of the four main elements of the machine A, B, C and D, identified above, all but the conveyer A are mounted as a single unitary structure. For this purpose the machine is provided with a bed 18 (Fig. 4) from which rise heavy columns or side walls 19 joined at their upper ends by an arch 20. The work supporting turret 15 is journaled for rotation about a vertical axis within the confines of this structure as hereinafter more particularly described.

The platforms 16 and 17 are fixed to the uprights 19 while the unloader D is fixed to the outer side of the right hand one of these uprights. The transfer mechanism B is in turn supported on the arch 20.

*Supply conveyer*

The conveyer A for supplying the blanks 10 to the machine comprises an endless roller belt 21 led over pairs of sprockets 22 and 23 (Fig. 4). This belt 21 comprises a series of articulated sections 24 (Fig. 6) and on the pivot pins which join these sections are rollers 25 which are received in the notches or interdental spaces in the sprockets 22, 23 (Figs. 5 and 6). On each of the belt sections 24 is a rigid upright post 26 adapted loosely to receive a blank 10 telescoped down over it in inverted position. The blanks 10 may be loaded onto the conveyer by hand or in any other suitable manner.

To advance the conveyer belt 21 step-by-step a drive mechanism is provided utilizing an electric driving motor 27 as a prime mover (Fig. 4). This motor is connected through a speed reduction gearing 28 and a worm drive 29 with a pinion 30 meshing with a gear 31, having an eccentric crank pin 32 on it. This pin is connected by a pitman 33 with a lever 34 (see also Fig. 6) rockably mounted on a shaft 35 and carrying a pawl. This pawl engages a ratchet wheel 37 pinned on the shaft 35 and to which the sprockets 23 are also pinned (Fig. 5). A back-up pawl 38 (Fig. 6) prevents reverse rotation of the ratchet wheel 37. Each full rotation of the drive gear 31 oscillates the pitman 33 through a full stroke and each stroke of this pitman in turn causes the conveyer belt 21 to be advanced one full step or, in other words, to bring the successive one of the blanks 10 into operative relation with the transfer mechanism B.

Each advancing step of the conveyer A is initiated by a momentary closure of a push button 39 (Fig. 4) which may, incidentally, be located on the front platform 16 if desired, to be convenient to the operator stationed there. Such closure of this push button 39 completes an energizing circuit for the motor 27 through suitable supply lines 40 so that its rotation is initiated. Once the gear 31 has started to revolve a cam 41, fast on it, pushes a leaf spring cam follower 42 to the left, thereby closing a normally open switch 43 to complete an alternative energizing circuit for the motor 27 from the supply lines 40, in shunt with that through the push button 39. The motor 27 is thus retained energized, despite subsequent release of the push button 39, until the gear 31 has completed a full revolution at which point the cam follower 42 drops back into the recess in the cam 41 thereby permitting the switch 43 to open and stop the motor 27. Each successive advancing step of the conveyer may thus be initiated at will simply by momentarily closing the push button 39.

*Overhead transfer mechanism*

The overhead transfer mechanism B embodies two workpiece engaging and hoisting units 44 and 45 (Fig. 4) which serve, respectively, to shift the blanks 10 from the conveyer A to station 1 on the turret and from station 1 to the unloader D. These units are mounted on a traversing carriage 46 having wheels 47 running along rails 48 (see also Fig. 7). These rails are fixed on a framework 49 carried by pedestals 50 rising from the main frame arch 20.

In brief, the carriage 46 is initially positioned as in Fig. 4 with the units 44, 45 alined respectively with a raw blank 10 at the terminus of the conveyer A and with a machined blank at turret station 1. The blank-engaging means of the two units are lowered simultaneously, engage the respective blanks noted, and are hoisted up again, lifting these blanks. Then the carriage is traversed to the right until the unit 44 is alined with turret station 1 and the unit 45 alined with the unloader D. Thereupon the blanks are lowered to the turret station and unloader, respectively. Having thus transferred the blanks the carriage 46 is traversed back to its initial position and this operation repeated and continued. Thus, in each cycle of movement the transfer mechanism supplies a new blank to the machine and removes a completed one from it.

Since the units 44, 45 are substantially identical a description of one will suffice for both. Upon reference to Fig. 4 it will be seen that the unit 44 includes an electromagnet 51 slidably mounted in vertical guides 52 which are bolted to the front side of the carriage 46 and depend from it. Since the blanks 10 are made of steel or other paramagnetic material they are effectually seized when the energized electromagnet contacts them and are disengaged by deenergizing the magnet. The electromagnet 51 is suspended by a cable 53 leading over a pulley 54 and anchored to a winding drum 55 at the rear side of the carriage 46 (see Fig. 8). The pulley 54 and winding drum or reel 55 are suitably journaled on a platform 56 which extends across and is fixed to the carriage 46.

To revolve the winding drum 55 for reeling in and out the cable 53, an electric driving motor 57 (Figs. 1 and 9) is used. This motor is connected through a speed reduction gearing 58 and worm drive 59 with a pinion 60, which in turn meshes with a gear 61 fast on the drum 55. Suitable control switches (not shown) may, of course, be provided for controlling the energization of the electromagnet 51 as well as the hoisting motor 57.

Traversing of the carriage 46 along the rails 48 must be accomplished with stoppage of the units 44, 45 accurately positioned at their respective alternative stations. A simple and rugged form of linkage-type drive (Fig. 8) has been provided for this purpose. A first link 62 is pinned to an upright rock-shaft 63 (see also Figs. 9 and 10) which is rotatably journaled in a suitable bearing 64 formed in one of the trackway supporting pedestals 50. A second link 65 is pivotally connected to the outer end of the first link 62 and to the carriage 46. It will be observed in Fig. 8 that when the linkage 62, 65 is moved from its distended position to the left (shown in full lines) to its distended position to the right (shown in dotted lines) that the carriage 46 will be traversed between its respective terminal positions in which the units 44, 45 on it are alternatively located at their two stations as described above.

To effect the necessary shift of the links 62, 65 with respect to each other in moving them between the two distended positions noted above a gear arrangement is utilized comprising, first of all, a stationary gear 66 coaxial with the rock-shaft 63 and bolted to the pedestal 50. Meshing with this gear 66 is a pinion 67 rotatably journaled on an intermediate portion of the link 62 adapted to roll about the stationary gear 66 as the link 62 is revolved by rotation of the shaft 63. A third pinion 68 meshes with the pinion 67 and is fixed to a pin 69 that forms a pivotal connection between the links 62; 65 though being fixed to the latter. Thus, as the shaft 63 is rocked in a counterclockwise direction (as viewed in Fig. 8) the link 62 will be swung correspondingly from the full line position to the dot-dash line position there shown. In the course of such movement of the link 62, the pinion 67 rolls around the stationary gear 66 and as a consequence rotates the pinion 68. Such rotation of the pinion 68 swings the outer link 65, which is connected to it through the pin 69, to the dot-dash position shown so that the linkage 62, 65, is partially collapsed. As the rotation of the shaft 63 continues in the direction noted the links 62, 65 continue to move toward each other until the linkage is completely collapsed after the link 62 has moved through 90°. Thereafter the linkage begins to distend on the opposite or right hand side, as viewed in Fig. 8, finally reaching the fully distended position shown in dotted lines.

Power actuated means, comprising an electric traversing motor 70 (Fig. 8) is used for oscillating the rock-shaft 63 to move the linkage as described. To this end the motor 70 is connected through a speed reduction gearing 71 and a worm drive 72 with a pinion 73 (see also Fig. 9) meshing with a gear 74 pinned to the lower end of the shaft 63. The motor 70 is reversible and is energized from supply lines 75, 76 (Fig. 8). The supply line 76 is permanently connected to one motor terminal 77. When the line 75 is connected to terminal 78 the motor rotates in one direction to revolve a shaft 63 clockwise, and when the line 75 is connected to the other terminal 79 the motor revolves in the opposite direction to turn the shaft 63 in a counterclockwise direction. A reversing switch 80 serves to connect the line 75 to the terminals 78, 79 when in its "forward" and "reversing" positions, respectively and to open-circuit the motor, thereby stopping the same, when in its "neutral" position shown. A limit switch 81 is interposed in the leads between the reversing switch 80 and the motor 70, this limit switch being arranged for actuation by a dog 82 on the link 62. When the link 62 is swung fully to the left, as shown in full lines in Fig. 8, it causes the switch 81 to open-circuit the lead from the reversing switch 80 to the terminal 79 though leaving the lead to the terminal 78 closed. Conversely, when the link 62 is swung fully to the right it causes the switch 81 to open the lead to the terminal 78 while leaving the lead to the terminal 79 closed.

A prime advantage of the traversing mechanism for the carriage 46 described above is the precision of location of the carriage at the respective ends of its path of travel despite inaccuracies in, or lack of, full distention of the linkage 62, 65. In this connection it should be noted that when the linkage 62, 65 is substantially fully distended, comparatively large angular movements, or inaccuracies in position of the rock-shaft 63 will result in but small corresponding displacements of the end of the link 65 and hence of the carriage 46. As a result even though the limit switch 81 should not stop the linkage in precisely its fully distended position, there will be very little inaccuracy in the location of the carriage.

Turret structure

The turret, designated generally at 15, for the machine C comprises an upright hollow spindle 83, the upper and lower portions of which are shown respectively in Figs. 15 and 16. The lower end of this spindle 83 is steadied against side play in a suitable sleeve bearing structure 84 bolted to the machine bed 18 while the weight of the turret is hung on roller bearings 85ª running on the upper end of a sleeve 85 bolted to the webbed central portion of the arch 20. As shown in Fig. 15 a tubular extension 86, for the upper end of the spindle 83, is fixed to it by cap screws 87, the axial bores within the spindle 83 and extension 86, communicating with each other and serving as a supply passage for a pressure fluid system hereinafter described.

Rigid with the upper portion of the spindle 83 is a horizontal disk shaped head casting 88 (Figs. 4, 7, 11, 15 and 16). In this head 88 are four holes 89, equidistantly spaced about the vertical axis of the spindle 83, and in which are loosely received the workpieces 10 at the four stations for the turret. On this head 88 are suitable clamping mechanisms hereinafter described for gripping the upper ends of the blanks 10 which project through the holes 89. The turret also comprises the four mandrels 14, previously mentioned, located beneath and projecting into the holes 89 in the head 88 and on which the respective blanks 10 are carried.

Indexing movement of the turret 15 is accomplished by means of a drive motor 90 operating through a pawl and ratchet drive substantially like that heretofore described for the conveyer A (see Figs. 14 and 15 and also Figs. 1 and 7). The motor 90 is drivingly connected through a speed reduction gearing 91 and a worm drive 92 with a pinion 93 which in turn meshes with the gear 94. This latter gear carries an eccentric crank pin 95 to which is pivotally connected a pitman 96, pivoted at its opposite end to a rocker link 97 loosely journaled on the upper end of the turret spindle extension 86. On this rocker link 97 is a driving pawl 98 engageable with a four-notch ratchet wheel 99 fast on the spindle extension 86. A spring pressed back-up pawl 100 prevents reverse rotation of the ratchet wheel. Each stroke of the pitman 96 thus causes the ratchet mechanism to advance the turret 15 rotatably through 90 degrees. A switch 101, operated by a cam 102 fixed to the ratchet wheel 99, operates in the manner of the switch 43 heretofore described for the conveyer A (cf. Fig. 4) to retain the motor 90 in operation during the full completion of each indexing step and then automatically stops the same.

To aid in locating the turret 15 precisely in its successive indexed positions a stop 103 (Figs. 4, 11 and 14) is spring urged toward the turret to engage one of the four complemental notches 104 located at 90 degree intervals about the periphery of the head 88. A solenoid 105 acts, upon energization thereof, to retract the stop plunger 103 to free the turret for rotation to its next successive position. This solenoid is arranged to be energized upon each initiation of the operation of the indexing drive motor 90 through a suitable common energizing circuit (not shown) for the solenoid and motor.

Turning now to the details of the turret mandrels 14, each of them serves to locate a workpiece telescoped down over it and, being of the expansion-jaw type, interiorly grip it. These four mandrels are carried respectively on the outer ends of four box shaped supports 108, spaced at intervals of 90 degrees about the turret axis, and bolted to complemental flat pads or faces on the spindle 83. Since all four of the mandrels are of identical construction, a description of one will suffice for all. Referring to Fig. 16, it will be observed that the mandrel 14 there detailed comprises a spindle 106 rotatably journaled in a sleeve bearing 107 received in a supporting bracket 108a bolted to the outer end of the box support 108. Fixed to the upper end of the spindle 106 is a spindle extension 109 having a longitudinal axial bore 110. Opening laterally from the bore 110 is a lower set of three slots 111 equidistantly spaced about the mandrel axis (Fig. 17) and at the upper end of the mandrel is a similar set of slots 112 (Fig. 16). In each of these slots is received a radially movable clamping shoe 114 which is, in general, thrust radially outward to grip the encircling side walls of the blank 10. Each of the shoes 114 is yieldably urged inward by leaf springs 113 (Fig. 16), which are riveted at their inner ends to the spindle extension 109 and arranged with their outer ends received in complemental notches in the shoes 114.

To actuate the shoes 114 radially outward into engagement with the blank 10, a plunger 115 is arranged to slide axially in the spindle bore 110 and carries at its opposite ends wedges 116 and 117 which bear against complementally tapered faces on the shoes 114. The lower wedge 117 is pinned to the plunger 115, while the upper wedge 116 has a lost motion connection with the plunger 115 through a pin 118 and a compression spring 119. The upper end of this pin 118 is fixed to the wedge, while its lower end carries a collar 120 slidable in the interior of the plunger 115 and against which the spring 119 bears. Thus when the wedge 117 is drawn downward it forces the lower shoes 114 outward. At the same time the upper wedge 116 is yieldably drawn downward so that it forces the upper shoes 114 outward. This yieldable connection between the wedges 116, 117 permits some differences in movement of them to accommodate any inequalities in the shape of the cavities within the workpieces.

In order to pull the wedges 116, 117 downward into shoe-projecting position, a weight 121 is utilized (Fig. 16). This weight is generally cup-shaped in form and in the machine shown, may be of, say, four hundred and fifty to five hundred pounds. It is attached to the lower end portion of a stem or rod 122, slidable in an axial bore 123 in the spindle 106 and attached at its upper end to the wedge 117. It will be observed that the lower portion of the bracket 108a, in which the lower end of the spindle 106 is journaled by a sleeve bearing 124, forms an annular housing 125 encircling and protecting the weight 121.

With the parts arranged as described, the weight 121 normally biases the wedges 116, 117 downward so that the shoes 114 are thrust outward into frictional engagement with an encircling blank 10. To free the blank from the mandrel it is necessary to lift the weight 121 and thrust the stem 122 upward. A hydraulic mechanism is provided for this purpose at the turret station 1 (Figs. 4 and 7). Thus a hydraulic cylinder 125 is located in a suitable recess in a machine bed 18 so that its plunger 126 will be alined with the lower end of the stem 122 of any particular one of the mandrels positioned above it. Upon admitting pressure fluid through suitable supply lines (not shown) to the cylinder 125 at the lower end of the plunger 126, the latter is thrust upward and thereby lifts the weight and stem so as to release the mandrel clamping shoes 114.

From the foregoing it will be seen that, in general, the mandrel clamps are such that each of them can be successively disengaged and reapplied through manipulation of the single hydraulic mechanism 125, 126, at station 1 where the blanks 10 are both loaded and unloaded. At all other stations the mandrel clamp shoes 114 remain actuated, but since a biasing weight is provided for that purpose, it is unnecessary to have any hydraulic actuating mechanism or the like for these mandrel clamps on the revolving turret itself.

Supplemental to the mandrel or interior clamp shoes 114 described above, means is provided for exteriorly gripping the blanks 10 on the mandrels 14 at certain stations, particularly when the blanks are being milled at station 3. Such supplemental gripping is necessary during the milling since each of the mandrels is freely revolvable in its supporting bearings 107, 124, described above and the blanks must be held non-rotatably during the milling of the transverse rib 11 on them. The supplemental clamping means is located on the upper turret head 88 (Fig. 11) and is of such character as to accommodate itself to variations in diameter of blanks 10 carried by the mandrels.

In the illustrated construction, each of the supplemental clamping mechanisms 127 comprises a pair of generally floatingly mounted jaws 128, 129. The jaw 128 has a workpiece engaging lug 130 on it, while the jaw 129 has a pair of such lugs 131, 132, so that the jaws grip the workpiece at three spaced points about its periphery. At one end, the jaws 128, 129 are connected by a pivot pin 133 journaled in a block 134 slidable in a T-slot 135 (Fig. 13) fashioned in a second block 136 screwed to the head 88. The slot 135 extends generally radially of the blank 10 so that the pair of jaws can move bodily, by shifting of the block 134 in the slot 135, to accommodate blanks of different diameters. To draw the free ends of the jaws 128, 129 together into clamping engagment with the work, a hydraulic piston 137 is provided in a cylinder 138 (Fig. 11). The piston is connected to the jaw 129, while the cylinder is connected to the jaw 128, and a compression spring 139 in the lower portion of the cylinder normally urges the jaws apart. To draw the jaws together, pressure fluid is supplied to the opposite face of the piston 137 through a supply line 140, thereby forcing the piston down into the cylinder and drawing the jaws together.

With the floating clamp jaw arrangement described above, it is necessary to provide some means for holding the jaws 128, 129 against movement with respect to the head 88 after they have been brought into gripping engagement with the work. For this purpose clamping feet 141 are arranged to span the gap between the ends of the clamping jaws (Fig. 11). These feet 141 are fixed to a stem 142 of a piston 143 slidable in a hydraulic cylinder 144 (Fig. 12.) A helical compression spring 145 normally urges the piston 143 upward so as to release the feet 141. To draw the feet down into clamping position against the jaws 128, 129, pressure fluid is admitted to the upper face of the piston 143 through a fluid supply line 146.

It will be understood from the foregoing that each of the supplemental clamping mechanisms 127 for the several stations on the turret are identical. In each of these clamping mechanisms pressure fluid for the cylinders 138 and 144 is supplied from some suitable source such as an air compressor (not shown) connected to the hollow interior 147 of the main turret spindle 83 (Fig. 15) through a conduit 148 and an axial bore 149 in the spindle extension 86. This pressure fluid is led off to the various clamp actuating cylinders through radial passages 150 (see also Fig. 11) individually controlled by manually operable three-way valves 151. These valves can, in the usual manner, be turned either to supply fluid to their respective cylinders, to shut off the flow of such fluid, or to bleed such fluid to atmosphere from the controlled cylinders. With the machine disclosed, the operator on platform 17 at the rear of the machine (see Fig. 1) ordinarily reaches in and manipulates the valves 151 to clamp the successive blanks at idle station 2 so that they will be ready for milling at station 3. Then upon the completion of the milling, he again manipulates the valves to cause release of the supplemental clamps so that the mandrels 14 can be freely revolved, as hereinafter described, at station 4 for drilling the lathe center recesses 12 in the ends of the blanks.

Milling workpiece

At station 3, three milling cutters 152, 153, 154 are fed across the exposed end of each blank 10 located at such station to reduce its end wall to predetermined thickness and to form the rib 11 on it, heretofore described (Figs. 18, 19, 20 and 21). The cutters are keyed coaxially to a common shaft or arbor 155 (Fig. 20) and the center cutter 154 in the group is of somewhat lesser diameter than the other two so that as they are fed across the end of the workpiece, the center cutter will mill the top of the rib 11 while the other cutters 152, 153, which are of equal diameter, will mill the adjacent portions of the blank lying on each side of the rib.

The drive mechanism for the arbor 155 terminates at two pinions 156, 157, secured to respective opposite ends of the same (Fig. 20) so as to equalize the torsional strain on the shaft. To drive these pinions in unison from a single drive motor 158 (Figs. 18 and 19) the motor is connected through a pinion 158ª with a gear 158ᵇ which is fast on a short shaft having a pinion 159 on its outer end that in turn meshes with a gear 160. This gear 160 is fixed on a shaft 161 having a pinion 162 keyed on its opposite end (Fig. 21). This pinion 162 in turn meshes with a gear 163 fixed on a transverse shaft 164 to which are fixed pinions 165, 166 meshing respectively with the pinions 156, 157 on the arbor 155. The drive motor 158, together with the gearing just described, which comprises the connection to the arbor 155, are mounted on the underside of a slide 167 in which the cutter arbor 155 is also journaled (Figs. 18, 19 and 20).

Means is provided to support the slide 167 for traversing movement in a direction radial of the turret in order to feed the milling cutters 152, 153, 154, generally diametrically across the exposed end of one of the blanks 10 at turret station 3. To this end, elongated guides 168 of inverted T-shape cross section (Figs. 18 and 20) are fashioned on the arch 20, these guides being received in complemental guideways 169 in the upper face of the slide 167. Gibs 170 secure the slide in place.

To feed the cutter slide 167 along the guides 168 an electric feed motor 171 is used as a prime mover (Fig. 18). This feed motor is connected through a speed reduction gearing 172, a worm drive 173 and a second speed reduction gearing 174 with a shaft 175 journaled in the arch 20 above the slide. This shaft 175 is in turn connected through a spiral gear 176 (see also Fig. 19) with a shaft 177, which parallels the path of movement for the slide 167. The shaft 177 is connected through gears 178 with a feed screw 179, which is rotatably journaled in the arch or superstructure 20 though restrained against endwise movement. A traveling nut 179 fixed on the slide 167 is threaded on the screw 178. Thus, as the feed motor 171 rotates the screw 178, the slide 167 is traversed along its ways 168. Both the cutter drive motor 158 and feed motor 171 are controlled through suitable manual switches (not shown) by the operator stationed at the rear of the machine.

An end wall on the blank 10 of accurately determined thickness $t$ (Fig. 3) is thus formed since the active edges of the milling cutters are accurately located at the fixed distance $t$ above the upper ends or noses of the mandrels 14 and the latter abut against the inner ends of the cavities in the blanks.

Drilling lathe center recess

At station 4 the lathe center recess 12, heretofore noted, is drilled in the exposed end of each of the blanks 10 presented at this station. As a means of insuring concentricity of the walls in the finished shell it is of prime importance that this lathe center recess 12 should be concentric with the cavity in the interior of the blank. In order to make sure of this relation, the lathe center recess 12 is formed by rotating the mandrel 14 which carries the blank and shifting a nonrotatable drill or counterbore bit into engagement with the end of the blank to fashion the recess.

In the illustrative construction (see Fig. 16) rotation of the mandrels 14 presented at station 4 is accomplished by means of an electric drive motor 180. This motor is connected through suitable gearing 181 with an axially shiftable clutch driving element 182. A complemental clutch driven element 183 is fixed to a gear 184 journaled on the bracket 108ª and meshing with a gear 185 concentric with the mandrel spindle 106 and fixed to the same. By shifting the clutch driver 182 upward, by means of a shifter fork 186 operated by hand lever 187, the clutch elements are engaged to connect the mandrel spindle 106 in driven relation with the motor 180 for rotation of the blank 10 at station 4. It will be observed that the connections from the clutch driven element on over to the mandrel spindle are duplicated for each mandrel (see Fig. 7) but that only one driving motor 180, together with the rest of its connections, need be provided for rotating the successive mandrels presented to it.

After the operator has started the motor 180 and drawn up the lever 187 to engage the clutch 182, 183 to set the mandrel 14 spinning at station 4, he brings a counterbore bit or drill 188 down into engagement with the blank 10 (Fig. 15). The bit 188 is fixed to the lower end of a plunger 189 arranged to be moved axially by means of a hand lever 190 (Fig. 7) through the medium of a cross shaft 191 and rack and pinion 192 (Fig. 15). The lathe center recess 12 is thus drilled in accurate alinement with the longitudinal center line of the cavity in the workpiece since the axis of rotation of the workpiece is coincident with the center line of its interior cavity by virtue of its mounting on the spinning mandrel. The frictional grip of the mandrel on the workpiece is, of course, sufficient to prevent relative rotation between the workpiece and mandrel during the drilling operation.

To prevent inadvertent indexing of the turret 15 while the drill bit 188 is still in engagement with the work a switch 190a (Fig. 14) is arranged to be held open by the handle 189 except when the latter is positioned for retraction of the bit. This switch is interposed in the circuit of the indexing motor 90 and retains the same open-circuited so long as the switch is open.

*Unloader*

The milled and drilled blanks 10 on the turret 15 are finally returned to station 1 after four successive indexing movements of the turret. Upon returning to this station they are, in brief, released from the mandrel 14 presented at the station, lifted from it and carried by the overhead transfer mechanism B to the unloader D, which dumps them successively onto a suitable conveyer indicated at 193 (Fig. 22).

To release the finished blanks 10 at station 1, the hydraulic plunger 126 is thrust upward, as heretofore described, thus lifting the weight 121 and stem 122 of the particular mandrel presented to it (see Fig. 16) thereby releasing the grip of the mandrel shoes 114 on the blank. The overhead conveyor mechanism B is positioned as shown in Fig. 4 with the unit 45 above turret station 1. Then the electromagnet of the unit 45 is lowered, energized to engage the finished blank, and rehoisted after which the transfer carriage 46 is traversed to the right until the blank 10 is properly alined to be received in the unloader mechanism D.

The unloader mechanism D comprises (Fig. 2) a framework 194 bolted to the outer side of one of the machine columns. A workpiece-receiving electromagnet 195 of jaw form is pivotally supported on this framework by a shaft 196 for rocking movement from the upright position shown in full lines in Fig. 22 to the horizontal position shown in dot-dash lines. To rock the unloader magnet 195 between the positions noted, a reversible electric drive motor 197 is utilized (Figs. 22, 23 and see also Figs. 1 and 4). This motor is connected with a gear 198 (journaled on the rock shaft 196 and bolted to the magnet 195) through a speed-reduction gearing 199, a wormdrive 200 and a pinion 201 (Fig. 24) meshing with a gear 202 fixed on an intermediate shaft 203, which also has pinned to it pinions 204 meshing with the gears 198.

The energization of the unloader electromagnet 195 may be controlled through the medium of a suitable manual switch (not shown) manipulated by the operator at the front of the machine. When one of the blanks 10 is lowered into position in the unloader's magnet 195, the latter is energized to seize the blank and the electromagnet of the hoisting unit 45 deenergized to release it. The unloader electromagnet 195 continues to hold the blank until it is swung down into position over the conveyor 193, whereupon the magnet is deenergized to drop the blank.

Operation of the unloader motor 197 is controlled by a manually operated reversing switch 205 (Fig. 22) movable from a neutral or N position shown, in which the motor is deenergized to either raising or lowering positions R or L in which the motor is respectively energized for raising and lowering the rockably mounted magnet 195. Electrical interlocks are also provided for insuring proper location of the blank 10 in the unloader and for stopping the motor 197 at the end of each cycle of movement. For the former purpose a switch 206 is interposed in the lead 207 from the "lowering" contact of the main switch 205, the switch 206 being closed by a dog 208, located to be actuated a blank 10 in place on the magnet, so that the motor 197 cannot be energized to lower the unloader magnet 195 until the blank is properly located. For the cycle control, a double switch 209 is interposed in the motor leads 207, 210 so as to open-circuit one or the other. This switch 209 is actuated by a pair of pins 211, 212 on one of the gears 198. Thus when the parts are positioned as shown in Fig. 22 the pin 211 shifts the switch 209 to open the motor lead 210 and thus prevent further raising of the magnet, although leaving the other lead 207 closed. Then when the "lowering" contact L of the manual switch 205 is closed the motor is energized to lower the magnet 195 until the pin 212 shifts the switch 209, whereupon lead 207 is opened, stopping the motor, and lead 210 closed, preparatory to a subsequent raising of the magnet when the manual switch is shifted for that purpose.

*Brief résumé of operation*

The blanks 10 to be machined are fed one by one to the machine (see Figs. 1 and 4) by the conveyer A, the successive blanks being telescoped over the uprights 26 on the conveyer belt to locate them properly for loading into the machine. The operator on the front platform 16 presses the push button 39 each time that he wishes the conveyer A to advance a step in order to present another blank. Then this same operator lowers the pick-up electromagnets of the units 44, 45 of the overhead transfer mechanism B, with the latter's carriage 46 positioned at the left hand extremity of its path of travel, as shown in Fig. 4. He causes these electromagnets to be energized so that they seize respectively the last blank in the row on the top of the conveyer A and the finished or machined blank located at station 1 of the machine turret 15. Incidentally, this latter blank has, at such time, been disengaged from its mandrel by means of the hydraulic plunger 126 which is thrust upward to lift the weight 121 and thereby cause the mandrel gripping shoes 114 to release. Next, the operator causes the pick-up electromagnets to be hoisted and traverses the carriage 46 of the transfer mechanism B to the right hand extremity of its path of movement. Thereupon the electromagnets are relowered so that the fresh blank 10 is telescoped down over the empty mandrel 14 at turret station 1, while the finished blank is lowered by the unit 45 to the unloader D.

Having located the transferred pair of blanks as described, the operator energizes the unloader electromagnet 195 to seize the machined blank presented to it and deenergizes the transfer mechanism electromagnets. These latter electromagnets are then rehoisted and the carriage 46 traversed back to its initial position preparatory to its next cycle of operation. To discharge the blank from the unloader D the operator shifts the manual switch 205 (Fig. 22) to its L or "lowering" position, whereupon the unloader motor 197 is energized to rock the electromagnet 195 down into its lowered position (shown in dot-dash lines in Fig. 22). Finally, the electromagnet 195 is deenergized to drop the finished blank onto the conveyer 193.

While the operator at the front of the machine manipulates the loading and unloading mechanisms for fresh and finished blanks, as described above, the second operator on the platform 17 at the rear of the machine operates the various controls of the machine for indexing the turret 15 and effecting the desired milling and drilling operations. Thus, after the first operator at the front of the machine has positioned a fresh blank on one of the mandrels 14 presented at station 1, he lowers the hydraulic piston 126 so that the weight 121 drops down and causes the mandrel shoes 114 to grip the blank. Then the second operator at the rear of the machine takes over. He energizes the turret indexing motor 90 (Fig. 14) to index the turret through one step, i. e., 90°, to move the fresh blank to station 2. While the blank is in station 2, the operator manipulates the corresponding set of control valves 151 (Fig. 11) to cause the supplemental clamping means 127 on the turret head 88 to grip the blank at station 2 and hold it against rotation. Next, the second operator starts the drive and feed motors 158 and 171 for the milling cutters 152, 154 (Fig. 18), so that the latter are fed across the end of the next preceding fresh clamped blank located at station 3. While these milling cutters are moving across the exposed end of the blank to mill it to predetermined thickness and fashion the rib 11, the operator turns to station 4, where he drills the lathe center recess 12 in the milled blank located there. For the latter purpose the second operator manipulates the valves 151 to disengage the supplemental clamping mechanism 127 on the blank located at station 4 (Fig. 11). Then he sets the mandrel drive motor 180 in operation (Fig. 16), and swings the hand lever 187 to engage the clutch 182, 183 to revolve the mandrel and blank at station 4. Thereafter he grasps the drill feed lever 190 (Figs. 14 and 15) and swings it to push the drill bit 188 down into engagement with the top of the revolving workpiece.

Upon completing the drilling operation noted above, the operator disengages the clutch 182, 183 to stop the rotation of the mandrel at station 4. By that time the milling operation at station 3 is complete and he reverses the feed for the milling cutters, moving them back to their initial position. The respective machining operations at stations 3 and 4 are thus complete so that the second operator is ready to index the turrent 15 through another step, thereby moving the completed or finished blank from station 4 back to station 1, where the first operator unloads it, as described above.

From the foregoing, it will be seen that a series of even large and heavy work blanks can be handled and machined expeditiously with the apparatus described, and through the services of only two operators. The various operations which these workmen respectively control are so correlated with each other, and the parts of the machine so located, that each man can efficiently supervise the operation of several different machine elements.

I claim as my invention:

1. In a machine tool, the combination of a turret mounted for rotational indexing movement, a plurality of upright expansion-jaw type mandrels rotatably mounted on said turret at spaced points about its axis of rotation, power actuated means for indexing said turret to bring said mandrels successively to a series of stations, a first metal removing tool at one of said stations, means on said turret for releasably exteriorly clamping individually tubular workpiece blanks telescoped over the respective mandrels to hold them against rotation, power actuated means for feeding said first tool with respect to a blank on a mandrel located at one of said stations to effect a metal removing operation on said blank with the latter clamped by its clamping means, a second metal removing tool located at a second station, and power actuated means for revolving successive ones of the mandrels at said second station with said second tool in engagement with the blanks on them and with said clamping means released.

2. In a machine tool, the combination of a revolubly mounted expansion-jaw type of mandrel shaped to receive and interiorly grip a generally tubular metal blank telescoped over it, a first metal removing tool, means for releasably exteriorly clamping a blank on the mandrel to hold it against rotation, power actuated means for effecting a relative feeding motion between the mandrel and said first tool with the blank clamped by said clamping means, a second metal removing tool, and power actuated means for revolving said mandrel with said second tool in engagement with a blank on it and said clamping means released.

3. In a machine tool, the combination of a turret comprising a spindle rotatably indexable about a vertical axis, a generally disk shaped head fixed to said spindle and having apertures therein at spaced points about the spindle, supporting means rigid with the spindle and projecting laterally therefrom in spaced relation beneath said head, a plurality of upright mandrels revolubly mounted on said supporting means and projecting upwardly through said apertures to receive generally tubular metal blanks telescoped down over the same through said apertures, said mandrels including means for releasably gripping interiorly the blanks telescoped over them, and means on said head including a pair of clamping jaws arranged at each of said apertures to embrace and releasably grip the exterior of a blank on the mandrel projecting therethrough.

4. In a machine tool, the combination of a turret comprising a spindle rotatably indexable about a vertical axis, a generally disk shaped head fixed to said spindle and having apertures therein at spaced points about the spindle, supporting means rigid with the spindle and projecting laterally therefrom in spaced relation beneath said head, a plurality of upright mandrels revolubly mounted on said supporting means and projecting upwardly through said apertures to receive generally tubular metal blanks telescoped down over the same through said apertures, said mandrels including means for releasably gripping interiorly the blanks telescoped over them, means on said head including a pair of clamping jaws arranged at each of said apertures to embrace and releasably grip the exterior of a blank on the mandrel projecting therethrough, means including a first metal removing tool mounted about said turret for machining successive blanks at one station in the indexing movement of the turret with the blank held against rotation by its associated pair of clamping jaws, power actuated means for revolving said mandrels when said clamping jaws are released, and means including a metal removing tool at a second station for engagement with successive blanks presented thereto in the indexing movement of said turret for machining of the same upon rotation of their mandrels.

5. In a machine tool, the combination of a turret comprising a spindle rotatably indexable about a vertical axis, a generally disk shaped head fixed to said spindle and having apertures therein at spaced points about the spindle, supporting means rigid with the spindle and projecting laterally therefrom in spaced relation beneath said head, a plurality of upright mandrels revolubly mounted on said supporting means and projecting upwardly through said apertures to receive generally cup shaped metal blanks telescoped down over the same through said apertures, said mandrels including means for releasably gripping interiorly the blanks telescoped over them, means on said head including a pair of clamping jaws arranged at each of said apertures to embrace and releasably grip the exterior of a blank on the mandrel projecting therethrough with the end face of the blank exposed, means including a milling cutter mounted for horizontal feeding motion above said turret for surfacing the ends of successive blanks at one station in the indexing movement of the turret with the blanks held against rotation by their associated pair of clamping jaws, power actuated means for revolving said mandrels when said clamping jaws are released, and means including a nonrotatable drill arranged to be fed axially against the ends of the blanks at a subsequent station for drilling the ends of successive blanks presented thereto in the indexing movement of said turret upon rotation of such blanks to the last mentioned station.

6. In a machine tool, the combination of a rotatably indexable turret comprising a rotatable spindle with a longitudinal bore and having a head on it with a plurality of apertures therein distributed about the axis of turret rotation, a plurality of revoluble mandrels on the turret projecting through respective ones of said apertures adapted to receive generally tubular workpieces telescoped over the mandrels through said apertures, said mandrels including means for releasably interiorly gripping the workpieces on them, supplemental clamping means for each of the workpieces on the several mandrels, each of the complemental clamping means comprising a pair of jaws floatingly mounted on said head to exteriorly grip a workpiece on the associated mandrel and a hydraulic actuator for the pair of jaws, and means for supplying pressure fluid to said actuators through said bore in the turret spindle.

7. In a machine tool, the combination of a head having an aperture therein, a mandrel projecting through said aperture and adapted to receive a generally tubular workpiece telescoped over the same, a pair of jaws slidable along the surface of said head adjacent said aperture and arranged to embrace the exterior of a workpiece on the mandrel, means on said head forming a guideway extending toward said aperture in a direction radial of the mandrel, a supporting block slidable in said guideway and to which one end of each of said jaws is pivotally connected, means for drawing together the other ends of said jaws to bring them into gripping engagement with the blank, a clamping foot overlying said other ends of said jaws, and means for urging said clamping foot toward said head to clamp said other ends of said jaws against the same and thereby restrain them against bodily movement.

8. In a machine tool, a mandrel adapted to receive a generally tubular workpiece telescoped over the same, a pair of clamping jaws arranged to embrace the exterior of a workpiece on the mandrel, means forming a floating support for said jaws to permit bodily movement thereof in order to accommodate variations in the diameter of the successive blanks on the mandrel, said last mentioned means comprising a support guided for movement radially toward and away from the axis of the mandrel and to which said jaws are pivotally connected at one end, and means for drawing together the other ends of said jaws to bring them into gripping engagement with the blank.

9. In a machine tool, a mandrel adapted to receive a generally tubular workpiece telescoped over the same, a pair of clamping jaws arranged to embrace the exterior of a workpiece on the mandrel, means forming a floating support for said jaws to permit bodily movement thereof in order to accommodate variations in the diameter of the successive blanks on the mandrel, said last mentioned means comprising a support guided for movement radially toward and away from the axis of the mandrel and to which said jaws are pivotally connected at one end, means for drawing together the other ends of said jaws to bring them into gripping engagement with the blank, and means for releasably locking said jaws and said first mentioned means against bodily movement relatively to the mandrel.

10. In a machine of the type described, the combination with work supporting means for rigidly holding a cup shaped metal workpiece with the face of its closed end exposed, of a gang of three rotary milling cutters revoluble about a common axis and comprising a pair of cutters of equal diameter with a third cutter of different diameter interposed between them, and means for feeding said gang of cutters generally diametrically across said exposed end face of a workpiece on the supporting means to surface said face and form an integral transverse coupling element thereon.

11. In a machine of the type described, for milling to a selected thickness the closed end of a cup shaped metal blank, the combination of an expansion-jaw type mandrel adapted to be inserted in and to grip interiorly a cup shaped metal blank with the free end of the mandrel abutting against the bottom of the cavity in the blank, a milling cutter, and means for feeding said cutter and mandrel relative to each other in a path transverse to the mandrel axis and with the cutter located a preselected fixed distance from said free end of the mandrel equal to a desired finished thickness of the end of the blank.

12. In a machine of the type described for machining to a selected thickness the closed end of a cup shaped metal blank, the combination of a freely projecting mandrel adapted to receive a blank telescoped over it with the free end of the mandrel abutting against the bottom of the cavity in the blank, means generally encircling a blank on the mandrel for releasably gripping the same exteriorly to hold it against rotation while leaving its end face exposed, and metal removing means located a preselected fixed distance from said free end of the mandrel for surfacing said exposed face of the blank.

13. In a machine of the type described for milling to a selected thickness the closed end of a cup shaped metal blank, the combination of a turret indexable about a vertical axis, a plurality of upright mandrels on said turret distributed about its center and adapted to receive inverted cup shaped blanks telescoped down over the same with the upper ends of the mandrels abutting against the bottoms of the cavities in the blanks, a milling cutter having its active edge located a predetermined fixed distance above said upper ends of said mandrels equal to the desired finished thickness of the closed ends of said blanks, and means for feeding said milling cutter horizontally across the ends of the blanks presented thereto by successive ones of said mandrels.

14. In a machine tool, the combination of a bed, spaced columns rising from said bed with a superstructure joining the upper portions of the columns, a turret disposed between said columns and beneath said superstructure for rotatable indexing movement about a vertical axis, a plurality of work holders on said turret distributed at spaced points about the latter's axis of rotation, each of said holders being adapted to receive an inverted cup shaped workpiece and hold the same with its closed end exposed, a rotatable milling cutter, means including a slide for supporting said cutter, and a guideway on said superstructure supporting said slide for traversing movement horizontally across the ends of successive blanks presented to the milling cutter by the indexing of said turret.

15. In a machine tool, the combination of a turret rotatably indexable about a vertical axis, four upstanding mandrels of the expansion-jaw type freely revoluble about their individual longitudinal axes and mounted on said turret at points spaced ninety degrees about the turret axis, power actuated means for indexing said turret through successive steps, each of a quarter revolution, to bring the mandrels successively into four different stations ending in their initial location during a full revolution of the turret, supplemental clamping means on the turret for releasably holding against rotation tubular metal blanks telescoped over respective ones of the mandrels, means operable at one of the stations for actuating the mandrels successively presented at such station to work-releasing and work-engaging positions to release a finished blank therefrom and engage a fresh blank, said supplemental clamping means being operable to engage the blanks on the mandrels successively presented at the second or next successive station, means including a milling cutter for surfacing the blanks presented at the third station while they are held against rotation by said supplemental clamping means, a non-rotatable metal removing tool at the fourth station, and means for revolving the mandrels successively presented at said fourth station.

16. In a machine tool, the combination of a rotatably indexable turret, a plurality of work supports revolubly mounted on said turret at spaced points about the axis of turret rotation and equidistant from the same, power actuated means stationarily mounted adjacent said turret, means for releasably coupling said power actuated means in driving relation with successive ones of the work supports presented by said turret at a predetermined station in the indexing movement of the turret for rotating each such successive work support at said station, and means for performing a metal removing operation at said station on the work blanks carried by the successively revolved work supports.

17. In a machine tool, the combination of a rotatably indexable turret, a plurality of work supports revolubly mounted on said turret at spaced points about the axis of turret rotation and equidistant from the same, said work supports being shaped to receive cup shaped metal blanks with their closed ends exposed for machining, a nonrotatable drill bit disposed in alinement with the longitudinal axis of successive work blanks presented at a station by the indexing movement of the turret and projecting toward the exposed closed ends of such blanks, means for feeding said bit longitudinally of the blanks into engagement therewith at such station, power actuated means stationarily mounted adjacent said turret, and means for connecting said power actuated means in driving relation with successive ones of the work supports when the latter are positioned at said station.

18. In a machine tool, the combination of a rotatably indexable turret, a plurality of work supports revolubly mounted on said turret at spaced points about the axis of turret rotation and equidistant from the same, and means including a single power actuated driver for revolving successive ones of said work supports when they are indexed into position at a predetermined station by the turret, said last mentioned means comprising a prime mover connected in driving relation with a clutch driving element arranged to mate successively with a series of clutch driven elements on the turret, individual ones of the latter being operatively connected to corresponding ones of the revoluble work supports.

19. In a machine tool, the combination of a turret rotatably indexable about a vertical axis, a plurality of upstanding mandrels revolubly mounted on said turret at spaced points about the latter's axis of rotation and equidistant from such axis, said mandrels being of the expansion-jaw type for gripping cup shaped workpieces telescoped down over the same and centering the workpieces with the axis of the workpiece cavity alined with the axis of the mandrel, a nonrotatable drill bit mounted above said turret for feed motion along a path coincident with the axes of successive mandrels presented by the turret at one station in its indexing movement, and means including a single power actuated driver stationarily mounted adjacent the turret for revolving successive ones of said mandrels when they are positioned at said station.

20. In a machine tool, the combination with a rotatably indexable turret having a plurality of releasable work-engaging devices on it located at spaced points about the turret's axis of rotation, of a plurality of individual means associated with respective ones of said devices for mechanically biasing them individually and releasably into engagement with work blanks carried thereby, and a single power actuated means stationarily mounted adjacent the turret for moving successive ones of said devices to work-releasing position upon presentation thereof to such stationarily mounted means by the indexing of the turret.

21. In a machine tool, the combination of a turret rotatably indexable about a vertical axis, a plurality of releasable work-engaging devices on said turret located at spaced points about the latter's axis of rotation and equidistant from such axis, each of said devices including a movable member shiftable into and out of frictional engagement with a work blank received on the device, means including a series of depending weights associated with respective ones of said device for biasing said members into work-engaging position, and means stationarily mounted adjacent said turret for lifting successive ones of said weights presented thereto by the indexing movement of the turret in order to release the grip of successive ones of said movable members on the respective work blanks.

22. In a machine tool, the combination of a turret rotatably indexable about a vertical axis, a plurality of upstanding mandrels on said turret located at spaced points about the latter's axis of rotation and equidistant from such axis, each of said mandrels comprising a spindle with shoes thereon movable laterally to engage a tubular blank telescoped over the mandrel, each of said mandrel spindles also having a longitudinal bore therein, means including stems movable axially in respective ones of said spindle bores and weights fixed to the lower ends of respective ones of said stems for forcing said shoes of the respective mandrels outward into work-engaging position, and means stationarily mounted adjacent said turret for lifting successive ones of said stems and the weights hung thereon to release the blanks on the associated mandrels.

23. In a machine tool, the combination of a turret rotatably indexable about a vertical axis, a plurality of upstanding mandrels on said turret located at spaced points about the latter's axis of rotation and equidistant from such axis, each of said mandrels comprising a spindle with radial slots therein, shoes in the slots movable laterally and yieldably urged inwardly, said shoes being engageable upon lateral displacement thereof with a tubular blank telescoped over the mandrel, wedges engageable with said shoes to force the same laterally upon downward shifting of the wedges, each of said mandrel spindles also having a longitudinal bore therein, means including stems movable axially in respective ones of said spindle bores and weights fixed to the lower ends of respective ones of said stems for pulling said wedges downward to force said shoes of the respective mandrels outward into work-engaging position, and means stationarily mounted adjacent said turret for lifting successive ones of said stems and the weights hung therefrom to release the blanks on the associated mandrels.

24. In a machine tool, the combination of a rotatably indexable turret, a plurality of releasable work-engaging devices located on said turret at spaced points about the latter's axis of rotation, means associated with each of said devices for mechanically biasing them individually and releasably into engagement with a work blank carried thereby, each of said last mentioned means including a member shiftable to release the associated work-engaging device, and means including a hydraulic actuator stationarily mounted adjacent the turret, and into registry with which, successive ones of said members are brought in the indexing of the turret, for moving registering one of said members to move the associated device to work-releasing position.

25. In a machine tool, the combination of a turret rotatably indexable about a vertical axis, a plurality of upstanding expansion-jaw type mandrels on said turret adapted to receive and interiorly grip generally tubular work blanks telescoped down over them, each of said mandrels including a sleeve with a plurality of laterally movable work-gripping shoes on it and a stem axially slidable in the sleeve to project the shoes, weights hung from the lower portions of respective ones of said stems for pulling the same downward to their shoe-projecting positions, a hydraulic actuator mounted beneath the turret and including a vertically projectible plunger for lifting the stems of successive ones of said mandrels presented to it by the indexing of said turret.

26. In a machine tool, the combination of a turret indexable about a vertical axis, a plurality of upstanding mandrels on said turret distributed about the latter's axis of rotation, each of said mandrels comprising a revolubly mounted sleeve with an axially movable stem in it and a plurality of laterally shiftable shoes arranged to be projected by downward motion of the stem and retracted upon upward motion of it, said shoes being positioned to grip a tubular workpiece telescoped over the mandrel, weights hung from the lower portions of respective ones of said stems to bias them individually into shoe-projecting position, and said weights being concentric with the axes of rotation for the sleeves of their respective mandrels.

27. In a machine tool, the combination of a turret rotatably indexable about a vertical axis, a plurality of mandrels on said turret spaced about its axis, each of said mandrels comprising a freely revoluble upstanding sleeve with an axially slidable stem in it, each of said mandrels also including a work-engaging shoe projectable laterally into work-engaging position upon downward movement of the associated stem and retractable upon upward movement of such stem, weights hung from respective ones of the stems to bias them downward and concentric therewith so as to avoid eccentricity of loading during rotation, and each of said sleeves having an encircling gear rigid therewith for connection of the same to a source of rotational driving power.

28. In a machine tool the combination of a turret indexable about a vertical axis, a plurality of upstanding mandrels on said turret distributed about the latter's axis of rotation at points equidistant radially from such axis, each of said mandrels comprising a revolubly mounted sleeve with an axially movable stem in it and a plurality of laterally shiftable shoes arranged to be projected by downward motion of the stem and retracted upon upward motion of it, said shoes being positioned to grip a tubular workpiece telescoped on the mandrel, weights hung from the lower portions of respective ones of said stems to bias them individually and releasably into shoe-projecting position, said weights being concentric with the axes of rotation for the sleeves of their respective mandrels so as not to interfere with the rotation of the same, means including a power actuated means located stationarily adjacent the turret for lifting successive ones of the stems and attached weights to disengage the shoes of the associated mandrels from their workpieces, each of said sleeves being encircled by a gear rigid with it, a plurality of driven means operatively connected to individual associated ones of said gears and each including a clutch driven element, and a driving means stationarily mounted adjacent the turret and including a clutch driver engageable with successive ones of said clutch driven elements.

29. In a machine tool, the combination with an indexable turret having a plurality of rotatable work holder devices thereon, and means mechanically biasing individual ones of said devices into work-engaging position, of means including a single power actuated mechanism mounted stationarily adjacent the turret for actuating successive ones of said devices to work-releasing position, and means including a second single power actuated mechanism also mounted stationarily adjacent the turret for revolving successive ones of said devices on the turret.

30. In a machine tool, the combination of a turret rotatably indexable about a vertical axis, means for releasably supporting a plurality of workpieces on said turret at spaced points about its axis, means manipulable by one operator from one side of the turret for supplying fresh workpieces to it and removing finished blanks from it after the latter have been returned adjacent to said one side of the turret by substantially a full revolution of the turret, and means manipulable by a second operator from the other side of the turret for performing a metal removing operation on successive workpieces presented by indexing of the turret.

31. In a machine tool, the combination of a turret rotatably indexable about a vertical axis, a plurality of work holders on the turret located at spaced points about the latter's axis, means at one side of said turret for supplying fresh work blanks and means at the other side of the turret for receiving machined work blanks, means for performing a metal removing operation on successive blanks presented thereto by successive ones of said work holders on the turret in at least one station of the latter's indexing movement, two work-engaging devices, means for traversing said work-engaging devices in unison between two limit positions, said work-engaging devices being alined alternatively in respective limit positions thereof with work holders on the turret located successively at a second station of the latter, one of said work-engaging devices being positioned to register with said work blank supply means in its other limit position, and said other work-engaging device being arranged to register with said finished-work receiving means in its other limit position.

32. In a machine tool, the combination of a turret rotatably indexable about a vertical axis, a plurality of work holders on the turret located at spaced points about the latter's axis, means at one side of said turret for supplying fresh work blanks and means at the other side of the turret for receiving machined work blanks, means for performing a metal removing operation on successive blanks presented thereto by said work holders on the turret in at least one station of the latter's indexing movement, and means for shuttling workpieces over from said supply means onto work holders presented successively to a second station of the turret and for shuttling the finished workpieces as they are returned to said second station over to said finished-work receiving means.

33. In a machine tool, the combination of a turret rotatably indexable about a vertical axis, a plurality of work holders on the turret located at spaced points about the latter's axis, means at one side of said turret for supplying fresh work blanks and means at the other side of the turret for receiving machined work blanks, means for performing a metal removing operation on successive blanks presented thereto by said work holders on the turret and in at least one station of the latter's indexing movement, and transfer means for shuttling workpieces over from said supply means onto work holders presented successively to a second station on the turret and for shuttling the finished workpieces as they are returned to said second station over to the finished-work receiving means, said transfer means comprising a carriage traversible horizontally between two limit positions in a path above the turret, said carriage having two work-engaging and hoisting units thereon disposed for alternative registry with said second turret station in alternate limit positions of the carriage.

34. In a machine tool organization, the combination of a work support adapted to receive a workpiece lowered down onto it, an overhead transfer mechanism comprising a carriage traversible horizontally between two limit positions in a path above said work support, two vertical guideways on said carriage spaced apart on it to register alternatively with the work support in the respective limit positions of said carriage, lifting electromagnets vertically movable on respective ones of said guideways, and power actuated hoisting means on said carriage for lifting and lowering said electromagnets.

35. In a machine tool, the combination of a plurality of work supports indexable to successive stations in an orbital path, means biasing individual ones of said holders to work-engaging position, means at one of said stations for releasing successive ones of said holders from their work blanks, a transfer mechanism arranged to shuttle to and fro between two limit positions and comprising two work-engaging devices disposed to register alternatively with the holder at said one station in the respective limit positions of said mechanism, one of said work-engaging devices serving to bring a fresh blank to the holder at said one station during a stroke of said mechanism in one direction and the other work-engaging device carrying a finished blank away from said station in said same stroke.

36. In a machine tool, the combination of a machine tool element traversable rectilinearly, and means for traversing said element between two limit positions with stoppage of the element accurately located at such positions, the last mentioned means comprising a pair of pivotally connected links, one free end of one of said links being pivoted at a point in the center of the path of travel for the element and the free end of the other link being pivotally connected to the element, and means for oscillating said one link about the pivot at its free end and simultaneously swinging said other link about its pivotal connection with said one link to move the linkage from a distended position in one direction, in which the element is located in one limit position, through a fully collapsed position in which one of the links overlies the other, to a fully distended position opposite to the first mentioned distended position and in which the element is located in its other limit position.

37. In a machine tool, the combination of a machine tool element traversable rectilinearly, a pair of links pivotally connected to each other to swing one across the other, means pivotally supporting the free end of one of said links for the latter to swing about a point intermediate the ends of the path of travel of said element, a stationary gear concentric with said point, a pinion rigid with the other link and located at the pivotal connection between the links, an intermediate pinion freely revoluble on an intermediate portion of said one link and meshing with both said stationary gear and the first mentioned pinion so as to roll about the stationary gear when said one link is oscillated and thereby revolve the first mentioned pinion to oscillate the rigidly connected other link in a direction opposite to the swing of said one link, means pivotally connecting said element to the free end of said other link, and power actuated means for oscillating said one link reversely.

38. In a machine tool, the combination of a turret indexable about a vertical axis, a first work-receiving element of generally upright post form on said turret, a second work-receiving element also of generally upright post form and disposed laterally of the turret, each of said work-receiving elements being adapted to receive a generally tubular workpiece telescoped down over it, an electromagnet operable when energized to seize a paramagnetic workpiece, and power actuated means for hoisting, lowering and traversing said electromagnet to lift from one of said work-receiving elements a workpiece seized by the magnet, transfer it laterally to a point above the other work-receiving element, and lower the workpiece into position on said other element.

39. In a machine tool, the combination of a work support adapted to receive and support a workpiece for machining, a first electromagnet disposed laterally of said work support, means supporting said electromagnet for rocking motion about a horizontal axis, a second electromagnet, power actuated means for hoisting, lowering and traversing said second electromagnet for conveying a workpiece seized by it from the work support to a point adjacent said first electromagnet for seizure of the workpiece by the latter, and means for rocking said first electromagnet about said axis to locate a workpiece held thereby in position to be dropped to an underlying unloading point upon deenergization of said first electromagnet.

40. In a machine tool, the combination of a first work-receiving element comprising an upright mandrel adapted to receive a workpiece of generally elongated tubular shape telescoped down over it, a second work-receiving element comprising an electromagnet of jaw form located at one side of said mandrel and mounted for rocking motion between an upright position in which the jaw of the magnet faces laterally (to receive a tubular workpiece in upright position in it) into a horizontal position in which a workpiece seized in the jaw magnet is tilted down horizontally, and means for transferring between said work-receiving elements a tubular workpiece while retaining the same in upright position both during the lateral transfer motion of it and vertical engaging and disengaging motions of the same with relation to respective ones of said work-receiving elements.

GEORGE F. BRYANT.